United States Patent
Winstead et al.

(10) Patent No.: US 7,911,375 B2
(45) Date of Patent: Mar. 22, 2011

(54) DOPPLER BEAM-SHARPENED RADAR ALTIMETER

(75) Inventors: Benjamin J. Winstead, Minneapolis, MN (US); Thomas W. Heidemann, Anoka, MN (US)

(73) Assignee: Honeywell International Inc., Morristown, NJ (US)

( * ) Notice: Subject to any disclaimer, the term of this patent is extended or adjusted under 35 U.S.C. 154(b) by 134 days.

(21) Appl. No.: 12/476,682

(22) Filed: Jun. 2, 2009

(65) Prior Publication Data

US 2010/0302088 A1 Dec. 2, 2010

(51) Int. Cl.
*G01S 13/08* (2006.01)
(52) U.S. Cl. ............... 342/120; 342/99; 342/91; 342/94
(58) Field of Classification Search .......... 342/120–122, 342/91, 94–95, 98–99, 136
See application file for complete search history.

(56) References Cited

U.S. PATENT DOCUMENTS

| | | | |
|---|---|---|---|
| 3,334,344 A * | 8/1967 | Colby, Jr. | 342/84 |
| 5,014,063 A | 5/1991 | Studenny | |
| 5,150,125 A | 9/1992 | Hager | |
| 5,736,957 A | 4/1998 | Raney | |
| 5,831,570 A * | 11/1998 | Ammar et al. | 342/26 B |
| 6,188,348 B1 | 2/2001 | Raney | |
| 6,897,804 B1 * | 5/2005 | Hager et al. | 342/120 |
| 6,980,153 B2 * | 12/2005 | Hager et al. | 342/120 |
| 7,218,268 B2 | 5/2007 | VandenBerg | |
| 7,518,547 B2 * | 4/2009 | Winstead | 342/120 |
| 7,652,615 B2 * | 1/2010 | Thomas et al. | 342/68 |
| 7,714,774 B2 * | 5/2010 | Winstead | 342/122 |
| 2003/0214431 A1 * | 11/2003 | Hager et al. | 342/115 |
| 2005/0253750 A1 | 11/2005 | Hager et al. | |
| 2006/0049977 A1 | 3/2006 | Vacanti | |
| 2007/0273572 A1 | 11/2007 | Thomas et al. | |
| 2008/0169972 A1 | 7/2008 | Greenwood et al. | |

(Continued)

FOREIGN PATENT DOCUMENTS

WO 9814799 4/1998

OTHER PUBLICATIONS

Raney, R.K.; Jensen, J.R.; Porter, D.L.; , "The delay-Doppler radar altimeter: robust and improved measurement capabilities," Oceans 2003. Proceedings , vol. 3, No., pp. 1313-1316 vol. 3, Sep. 22-26, 2003.*

(Continued)

*Primary Examiner* — John B Sotomayor
(74) *Attorney, Agent, or Firm* — Fogg & Powers LLC (57) ABSTRACT

Systems and methods for Doppler beam sharpening in a radar altimeter are provided. In one embodiment, a method comprises receiving a return signal at a radar altimeter receiver and applying a first gate to the return signal to select at least a first component of the return signal. Spectral analysis is performed on the first component of the return signal to generate a plurality of frequency bins, wherein each frequency bin is centered around a different frequency across a Doppler shift frequency spectrum for the first component of the return signal. The method further comprises tracking the first component of the return signal, selecting a first frequency bin of the plurality of frequency bins based on the Doppler shift frequency of the first component of the return signal, and outputting a portion of the first component of the return signal falling within the first frequency bin for further processing.

20 Claims, 6 Drawing Sheets

U.S. PATENT DOCUMENTS

2010/0225531 A1* 9/2010 Johnson ............... 342/25 A
2010/0302088 A1* 12/2010 Winstead et al. ............ 342/120

OTHER PUBLICATIONS

Shum, C.K.; Abusali, P.A.M.; Chung-Yen Kuo; Hyongki Lee; Ogle, J.; Raney, R.K.; Ries, J.C.; Smith, W.H.F.; Svehla, D.; Changyin Zhao; , "Orbit Accuracy Requirement for Abyss: The Space Station Radar Altimeter to Map Global Bathymetry," Geoscience and Remote Sensing Letters, IEEE , vol. 6, No. 4, pp. 653-657, Oct. 2009.*

Skolnik, Merrill, "2.10 Clutter Filter Bank Design", "Radar Handbook", Jan. 22, 2008, pp. 2.52 thru 2.11, No. 3, Publisher: McGraw-Hill Professional.

European Patent Office, "European Search Report", Aug. 19, 2010, Published in: EP.

Picardi et al., "Extensive Non-Coherent Averaging in Doppler Beam Sharpened Space-Borne Radar Altimeters", "Geoscience and Remote Sensing Syposium Proceedings", 1998, pp. 2643-2645, Publisher: IEEE.

* cited by examiner

DOPPLER BEAM-SHARPENED RADAR ALTIMETER

BACKGROUND

An aircraft radar altimeter system used during flight receives return signals that are Doppler shifted due to the aircraft's velocity. For any given velocity, the further ahead the tracked terrain or object is from the aircraft, the larger the Doppler shift in the return signal. Maximum Doppler shift occurs when the aircraft is flying directly towards the detected terrain or object. Typical radar altimeter systems filter out any return signals outside of a maximum Doppler frequency range of interest. Bandwidths and filters in the altimeter system are set to respond to the maximum Doppler shift associated with what terrain would be visible up to the particular aircraft's cruising velocity.

The radar altimeter's filter input typically has white noise across the entire frequency range. Narrowing the frequency range of interest reduces noise in the altimeter system. Therefore, setting the radar altimeter system to filter out any return signals outside of a frequency range of interest improves the signal to noise ratio (SNR). However, when the frequency range is narrowed, the ability of the system to track return signals (corresponding to terrain features) suffers.

For the reasons stated above and for other reasons stated below which will become apparent to those skilled in the art upon reading and understanding the specification, there is a need in the art for a radar altimeter system that can track a return signal over the entire range of possible Doppler shift frequencies at any velocity with an improved signal to noise ratio.

SUMMARY

The following specification provides for a Doppler beam sharpened radar altimeter. This summary is made by way of example and not by way of limitation. It is merely provided to aid the reader in understanding some aspects of at least one embodiment described in the following specification.

Systems and methods for Doppler beam sharpening in a radar altimeter are provided. In one embodiment, a method comprises receiving a return signal at a radar altimeter receiver and applying a first gate to the return signal to select at least a first component of the return signal. The method also comprises performing spectral analysis on the first component of the return signal to generate a plurality of frequency bins, wherein each frequency bin is centered around a different frequency across a Doppler shift frequency spectrum for the first component of the return signal. The method further comprises tracking the first component of the return signal and selecting a first frequency bin of the plurality of frequency bins based on the Doppler shift frequency of the first component of the return signal. Finally, the method comprises outputting a portion of the first component of the return signal falling within the first frequency bin for further processing.

BRIEF DESCRIPTION OF THE DRAWINGS

These and other features, aspects, and advantages are better understood with regard to the following description, appended claims, and accompanying drawings where:

The various described features are drawn to emphasize features relevant to the embodiments disclosed. Like reference characters denote like elements throughout the figures and text of the specification.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments disclosed herein relate to a Doppler beam-sharpened radar altimeter. The radar altimeter comprises Doppler channels that track components of a return signal with a gate based on feedback from a processor within the Doppler channel. The Doppler frequency shift spectrum (also referred to herein as the Doppler spectrum) is separated into frequency bins in order to improve the signal to noise ratio through only processing the bandwidth of a selected frequency bin. The frequency bins are selected based on a defining characteristic of the signal or a predetermined process, such as selecting the frequency bin containing the maximum signal level. Accordingly, methods and apparatus for a Doppler beam-sharpened radar altimeter are discussed in further detail below.

Figure 1:
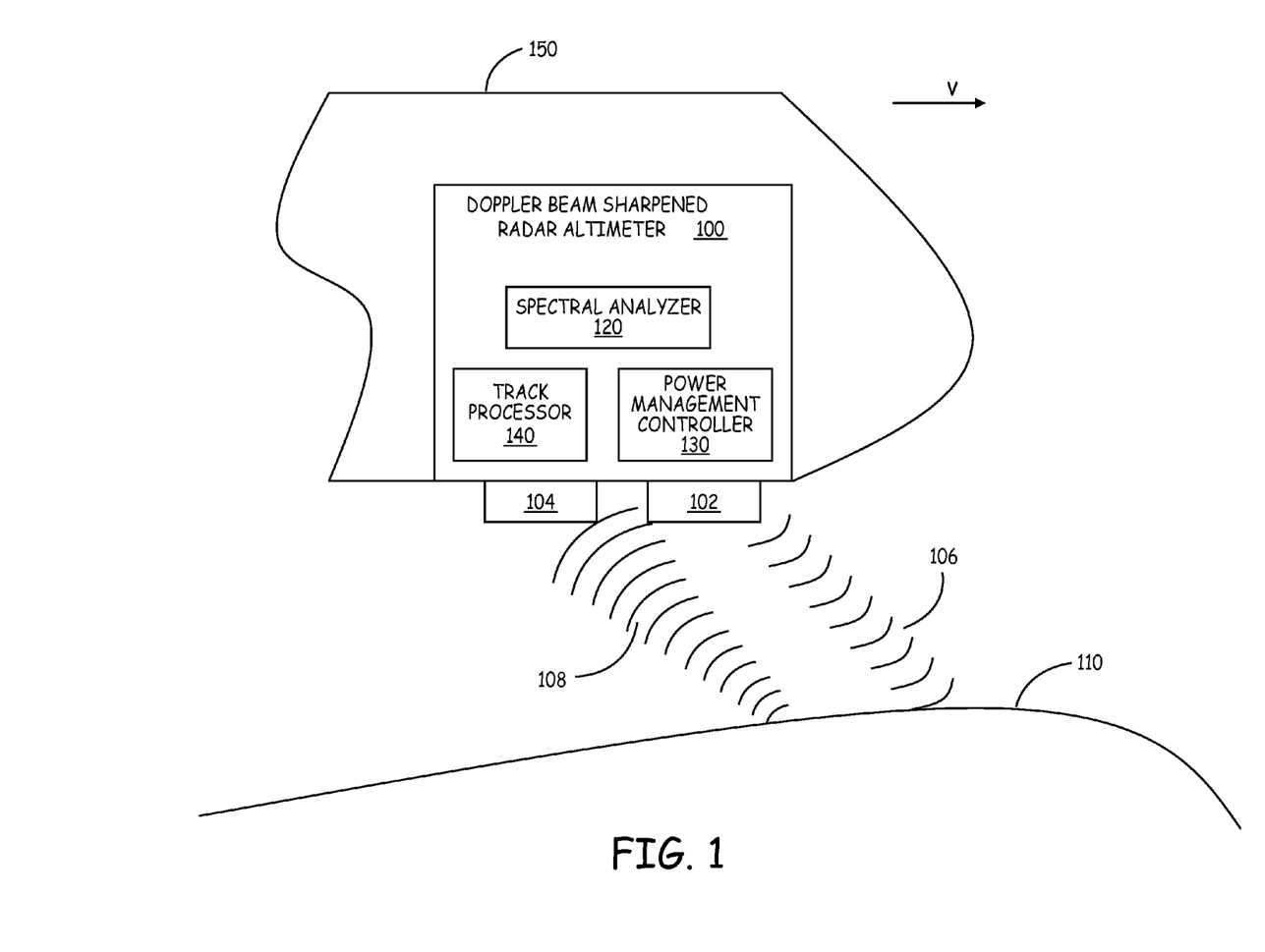
FIG. 1 is a block diagram of one embodiment of the present invention of an aircraft having a Doppler beam sharpened radar altimeter.

FIG. 1 is a block diagram of one embodiment of the present invention of an aircraft 150 having a Doppler beam sharpened radar altimeter 100. The aircraft 150 (for example, an airplane, helicopter, or the like) is shown flying with velocity v. A Doppler beam sharpened radar altimeter 100 is implemented in the aircraft 150. In other embodiments, the Doppler beam sharpened radar altimeter 100 is implemented in other systems including cruise missiles, satellites, or ground or air based tracking radar systems. Whatever device the altimeter 100 is implemented in is also referred to herein as a platform.

The radar altimeter 100 comprises a transmitter 102 and a receiver 104. The transmitter 102 transmits signals 106 (for example, pulsed radar signals) towards a target 110. The target 110 can be terrain or any other detectable object. The receiver 104 receives or detects return signals 108 reflected from the target 110. Due to the aircraft 150 flying with velocity v, the return signals 108 will be Doppler shifted. As the aircraft 150 flies towards the target 110, the return signals 108 are Doppler shifted to be higher in frequency than the signals 106. As the aircraft 150 flies away from the target 110, the return signals 108 are Doppler shifted lower in frequency.

The maximum Doppler shift occurs along the line of flight of the aircraft 150. For targets perpendicular to the direction of motion of the aircraft 150, there is zero Doppler shift because there is no relative velocity between the perpendicular target and the aircraft 150.

The radar altimeter 100 further comprises a spectral analyzer 120, a power management controller (PMC) 130, and a track processor 140. The components of the radar altimeter 100 are communicatively coupled to one another as needed using suitable interfaces and interconnects. The PMC 130 comprises power management circuitry that detects the signal level of the return signal 108 (also referred to herein as signal strength), and has a control loop running to continuously control the transmit power to maintain a certain signal level of the return signal 108. The track processor 140 tracks one or more components within the return signal 108. For example, one component within the return signal 108 could correspond to a target nearest to the radar altimeter 100.

The spectral analyzer 120 breaks down the entire Doppler spectrum (of return signal 108) into a plurality of smaller sub-spectrums (referred to herein as frequency bins or bins). Bins are spaced frequency ranges across a part or whole of the Doppler spectrum. Each frequency bin responds to a different range of Doppler shift frequencies (in other words, each bin is centered on a different Doppler shift frequency). Generally, the center point of a band pass filter corresponds to the maximum sensitivity of that filter. To be detectable by the filter, signals near the extremities of a filter's bandwidth need to be stronger than signals with frequencies close to the center point. Because the frequency bins are also subject to this same limitation, the frequency bins may be designed to overlap at least another frequency bin to ensure each frequency is detectable. Each frequency bin can provide enough overlap with adjacent frequency bins to ensure complete coverage of all possible Doppler frequencies that a target 110 could exhibit. One embodiment overlaps the frequency bins by 50%, so that each frequency is covered by two bins (except for the ends of the Doppler spectrum). At an end of the Doppler spectrum, a frequency bin may be overlapped by another frequency bin that encompasses frequencies outside the Doppler spectrum. On any given frequency segment there could potentially be redundant information, but this does not effect how much signal can be picked up. Other amounts of overlap are contemplated, such as 0% overlap up to 80% overlap.

The spectral analyzer's 120 application of several separate frequency bins to the Doppler spectrum (as opposed to applying only a single band-pass filter) improves the signal to noise ratio (SNR) by filtering out the noise outside of a given bin. Relative to prior systems, with embodiments of the present invention, less transmit power is needed to provide a return signal that satisfies SNR thresholds necessary for tracking the target 110. As would be appreciated by one of ordinary skill in the art upon reading this specification, reducing the transmit power from a radar altimeter has the benefit of making use of the radar altimeter harder to detect by enemy electronic surveillance. This is especially helpful in a military application when the platform 150 is traveling through hostile territory and must evade detection.

Figure 2A:
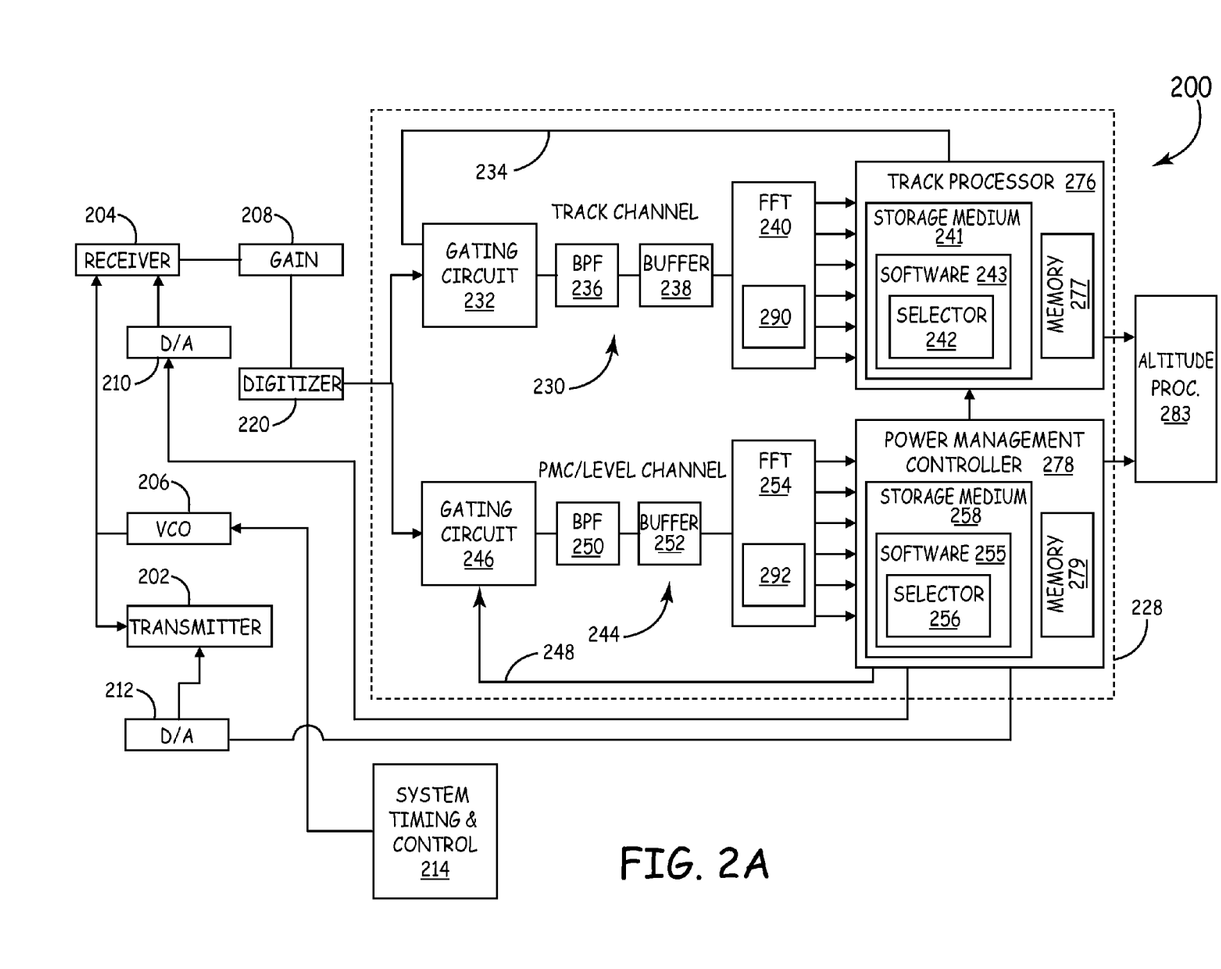
FIG. 2A is a block diagram of one embodiment of the present invention of a Doppler beam sharpened radar altimeter system.

FIG. 2A is a block diagram of one embodiment of the present invention of a Doppler beam sharpened radar altimeter system 200. The radar system 200 is installed on a platform, for example, the aircraft 150 of FIG. 1. The radar system 200 includes a system timing and control controller 214, a transmitter 202 to transmit radar signals (such as signals 106) and a receiver 204 to receive return signals (such as return signals 108). The radar altimeter system 200 also includes a voltage control oscillator (VCO) 206 that provides frequency control for the receiver 204 and the transmitter 202, which is under control of the system timing and control controller 214. A digitizer 220 coupled to the receiver 204 provides for analog to digital conversion. In one embodiment, the receiver 204 converts signals from their transmitted frequency down to an intermediate frequency (IF). Further illustrated in FIG. 2A, the radar altimeter system 200 includes digital to analog (D/A) converters 212 and 210 to convert digital signals from a spectral analyzer 228 to the transmitter 202 and the receiver 204, respectively.

The spectral analyzer 228 comprises two different Doppler channels in this embodiment. The Doppler channels include a track channel 230 and a PMC channel 244. In one embodiment, the Doppler channels 230 and 244 demodulate intermediate frequency signals from the receiver 204 down to baseband. In other embodiments, receiver 204 demodulates to directly output a baseband signal. Baseband is the minimum frequency that a system operates on. Here, the baseband is 0 Hz. At baseband, the only frequency component of the return signal left is the Doppler shift.

The channels 230 and 244 include gating circuits 232 and 246, respectively. Gates are used to measure the reflected energy within a prescribed time period. The gating circuits 232 and 246 gate the signals from the receiver 204 by selecting a certain time range of samples that will be analyzed by the spectral analyzer 228. Each gate is considered to represent a window of time in which the system monitors the reflected energy (that is, the radar altimeter begins to accumulate energy at the beginning of each gate and stops accumulating this energy at the end of each gate). The width of a gate (that is, width in time) is typically set to be equal to the transmit pulse width, but can be longer or shorter. Gate widths are generally dependent on the track pulse width in that as the transmit pulse width is increased the track and PMC gate widths are also increased. Gating is not to be confused with windowing, which is discussed below.

In another embodiment, the spectral analyzer 228 may comprise additional Doppler channels. For example, a third channel could function as a level channel with different gate positions or gate widths than the PMC channel 244. A level channel is used to determine if a return signal's level is large enough to be considered a valid target. However, for purposes of this description, the PMC channel 244 functions as a level channel.

The radar system 200 also includes a gain circuit 208 placed before the digitizer 220 that controls the gain to provide optimal signal levels to the digitizer 220. In embodiments of the present invention, a gain may also be digital and be placed between the digitizer 220 and the spectral analyzer 228. In alternative embodiments, the channels 230 and 244 each include a gain circuit 208, which may be each assigned different gain values. The channels 230 and 244 in this embodiment include the band pass filters 236 and 250, and buffers 238 and 252, respectively. The buffers 238 and 252 are memories that store samples of the return signals.

A fast Fourier transform (FFT) 240 separates the return signal 108 into one or more frequency bins. An FFT 254 separates the return signal 108 into one or more frequency bins independent of the FFT 240. The FFTs 240 and 254 are shown separate from the track processor 276 and PMC 278, respectively. However, in other embodiments, the FFT 240 is implemented in software 243 and the FFT 254 is implemented in software 255.

Windowing schemes 290 and 292 are applied with the FFTs 240 and 255, respectively. Windowing is a digital signal processing (DSP) technique typically used to reduce the sensitivity of one FFT bin output compared to signals present in other (usually undesired) FFT bins. Windowing reduces the scalloping loss that occurs when the frequency of a signal of interest lies half-way between the center frequencies of two adjacent bins. Windowing widens the response of each of the FFT frequency bins but does not change their spacing. Different windowing schemes increase the bandwidth of the frequency bins by different amounts with varying effects on any given bin's response to signals outside that bin. Windowing schemes 290 and 292 that can be used include a Hamming window, Hann window, and Blackman window. The scalloping loss can also be reduced by zero-padding before the FFT or after windowing schemes 290 and 292.

Advantages of applying an FFT and a windowing scheme includes that the narrower bandwidth of each frequency bin reduces the detected noise present at the signal acquisition logic. Also, gating the return signal prior to applying the FFTs 240 and 254 reduces processing requirements because the processors 276 and 278, respectively, only have to look at a portion of the return signal.

In one alternative embodiment, the spectral analyzer 228 includes a bank of band pass filters for separating the return signal into the frequency bins in place of the FFTs 240 and 254. Each individual band pass filter is focused on a different frequency of the Doppler spectrum. These band pass filters may overlap each other in a similar manner as the frequency bins from the FFTs 240 and 254.

The signal acquisition logic of the radar system 100 includes a track processor 276 and a PMC processing unit 278 (also referred to herein as PMC 278). The track processor 276 receives an input from the FFT 240 and from the PMC 278. The track processor 276 comprises a memory 277 used for storing a tracking routine and controls the gating circuit 232 via a feedback loop 234. Additionally, the track processor 276 provides an output to an altitude processor 283 and also to the gating circuit 246. In one embodiment, the track processor 276 provides separate gate positions and gate widths for both gating circuits 232 and 246.

Figure 2B:
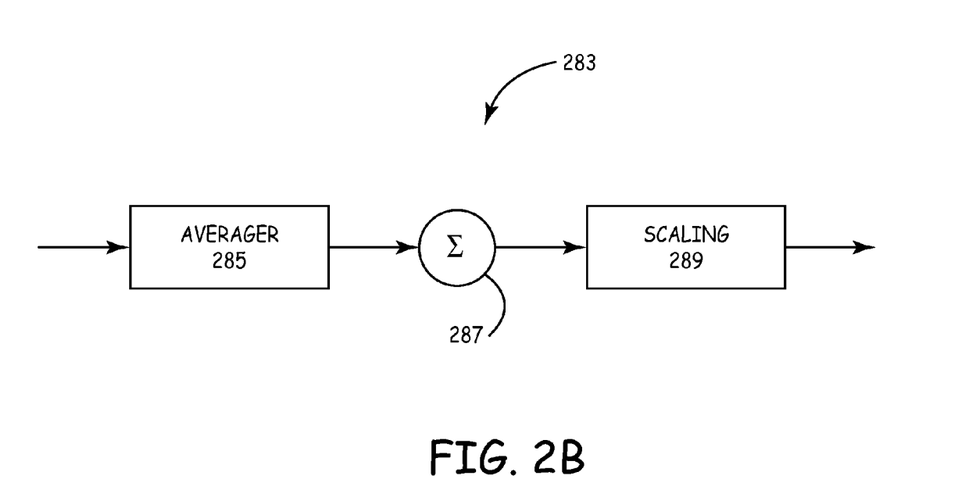
FIG. 2B is a block diagram of one embodiment of the present invention of an altitude processor.

The altitude processor 283 determines the altitude based on inputs from the track processor 276 and the PMC 278. FIG. 2B is a block diagram of one embodiment of the present invention of an altitude processor 283. The altitude processor 283 comprises an averager 285, an altitude adjustment 287, and a scaling 289. The averager 285 receives inputs of range measurement or gate positions and smoothes out the gate position movements and the noise inherent in the measurements. In one embodiment of the altitude processor 283, the averager receives inputs from the track processor 276. The scaling 289 converts the range measurements from units of increments of the gate position to the desired units (typically feet or meters).

The altitude adjustment 287 serves to account for biases in the Doppler beam sharpened radar altimeter 200 that would result in incorrect altitude measurements. In one embodiment of the altitude adjustment 287, these measurements are compensated for to ensure a zero altitude indication when the platform is at zero feet. Values that can be adjusted to be compensated for include the length of cable between the transmitter 202 and the receiver 204 and their associated antennas, the separation between the transmitter 202 and receiver 204 antennas, the height of the aircraft above the ground when stationary (or at the point at which it is landing when the wheels touch the ground), or delays inherent to the receiver 204 or transmitter 202 (such as filter delays, pulse rise times, and the like).

In the embodiment of the radar altimeter 200 illustrated in FIG. 2A, the PMC 278 receives the output from FFT 254. The PMC 278 controls the gaiting circuit 246 via a feedback loop 248 and comprises a memory 279 used for storing a power management control routine. The PMC 278 maintains the return signal received at receiver 204 at an approximately constant signal strength by controlling the power level of the transmitted signal from the transmitter 202. For example, if a return signal is detected above a threshold level, the PMC 278 will instruct the transmitter to transmit the next signal at a lower power level. Keeping the return signal strength below a threshold level decreases the probability of the platform being detected through its emissions. If a return signal is too weak, the PMC 278 instructs the transmitter to transmit at a higher power level (in order for the range gate to continue to track the nearest target) until a new target is detected with a higher power level.

The track processor 276 and the PMC processor 278 perform further signal processing on signals that are within the time period of their gates. Tracking or range measurements are done on the minimum trackable signal within each of the filters or frequency bins. The track processor 276 applies a range gate using the gating circuit 232 to the return signal to track the range of the target. The PMC 278 applies a level gate to the return signal using the gating circuit 246.

The track channel 230 also comprises a selector 242. The selector 242 selects the frequency bin or filter in the track channel 230 to use for further signal processing. Based on the frequency bin that currently contains the return signal component of interest, the selector 242 passes the signal from that frequency bin to the track processor 276. In the embodiment shown in FIG. 2A, the selector 242 is implemented in the software 243 that is executed by the track processor 276. The software 243 comprises program instructions that are stored on a suitable storage device or medium 241. Typically, a portion of the software 243 executed by the track processor 276 and one or more data structures used by the software 243 during execution are stored in a memory 277. Similarly, the PMC channel 244 also comprises a selector 256 for selecting the frequency bin or filter to use for further signal processing. The selector 256 is implemented in software 255 stored on a storage medium 258. Typically, a portion of the software 255 executed by the PMC 278 and one or more data structures used by the software 255 during execution are stored in a memory 279.

The frequency bin (or filter, for the embodiment of a bank of filters) can be selected based on any defining characteristic of a portion of the pulse having a frequency corresponding to that frequency bin. The selector 242 is in the track channel 230 and thus selects the frequency bin which contains the defining characteristic of the signal. In one embodiment, defining characteristic is a portion of the pulse that corresponds to the nearest range. The range gate tracks the pulse corresponding to the nearest target, and the selector 242 selects the frequency bin which the characteristic of the pulse corresponding to the nearest range falls into. The track channel 230 operates to track the nearest target by enabling the selector 242 to pick the bin with the largest signal level at the current gate position and use that signal level to compare to a track threshold to determine if the gate position needs to be increased or reduced. The track threshold is a signal level that outputs a signal that can be directly computed into a range corresponding to the actual distance to the target when the range gate is in position. If the range gate is too far inbound, the output signal is less than the track threshold. If the range gate is too far outbound, the output signal is greater than the track threshold.

Similarly, in one embodiment, the PMC selector 256 selects the frequency bin in which the pulse with the strongest signal falls into. In another embodiment, the same bin chosen by the track channel 230 is then used by the PMC channel 244 to control the transmit power to maintain the signal return level at a designed threshold or reference level. In this embodiment, the PMC channel 244 does not just pick the maximum signal level from the FFT 254 (or, in another embodiment, the bank of band pass filters) to determine which frequency bin to operate on but instead operates on the bin selected by the track channel 230 selector 242.

Various aspects of the Doppler beam sharpened radar altimeter 200 (for example, but not limited to, the gating circuits 232 and 246, the gain 208, the digitizer 220, the selectors 242 and 256, and the FFTs 240 and 254) can be implemented using integrated or discrete electronic components, and combinations thereof, as known to one of ordinary skill in the art.

Figure 3A:
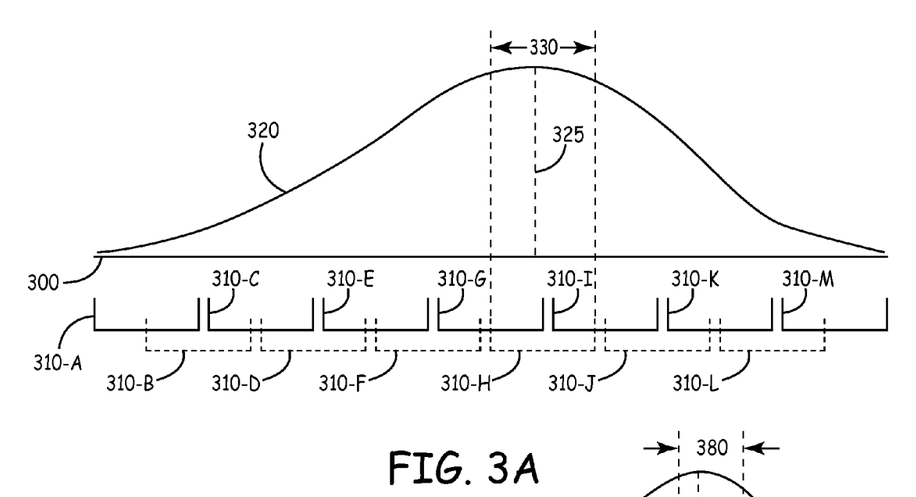
FIGS. 3A and 3B are illustrations of embodiments of the present invention of a Doppler shift frequency spectrum separated into a plurality of frequency bins.
Figure 3B:
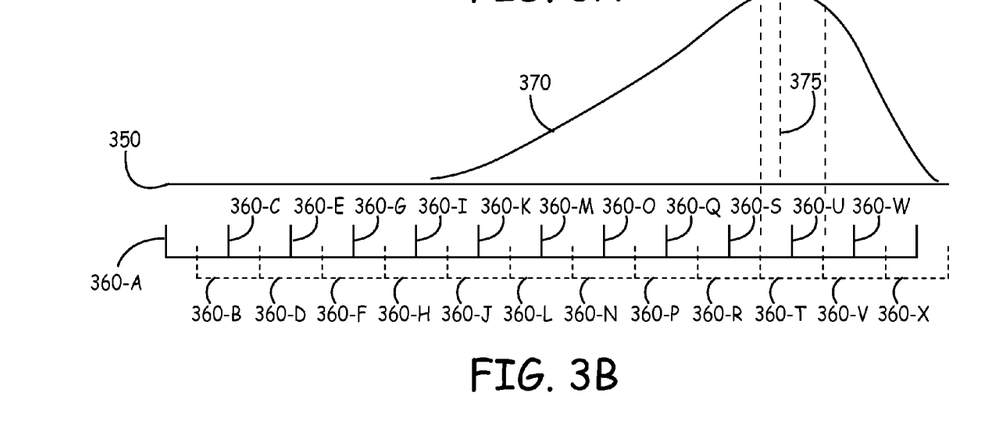

FIGS. 3A and 3B are illustrations of embodiments of the present invention of a Doppler shift frequency spectrum 300 and 350 separated into a plurality of frequency bins, respectively. FIG. 3A shows a portion of the Doppler spectrum 300 over which a component of the return signal 320 (also referred to as the pulse 320) displays Doppler frequencies. For illustrative purposes, FIG. 3A corresponds with the track channel 230; however it is to be understood that other channels can be used. A track gate has been applied to the return signals 108 to select the pulse 320. Only signals falling within the track gate are shown in FIG. 3A. The pulse 320 is a return pulse corresponding to a target, which is the closest terrain object to the aircraft 150.

The Doppler spectrum 300 is split into thirteen frequency bins 310-A through 310-M by the FFT 240. The frequency bin 310-A corresponds to less Doppler shift than the frequency bin 310-M. The number of frequency bins 310 is chosen for illustration, and it is to be understood that any number of frequency bins can be used. The frequency bins 310 overlap at least one other frequency bin 310. FIG. 3A corresponds to the FFT 240 only being applied to the portion of the Doppler spectrum 300 that corresponds to the signals found within the track gate. Alternative embodiments apply the FFT 240 to the entire Doppler spectrum return signals 108 can exhibit.

The selector 242 selects the frequency bin in which the pulse 320 falls into for further signal processing. The return pulse 320 has a peak 325. In FIG. 3A, the peak 325 falls into the frequency bins 310-H and 310-G, but falls closer to the maximum sensitivity point of the frequency bin 310-H. In other words, the return pulse 320 has the majority of its power spectrum closer to the center of the frequency bin 310-H than frequency bin 310-G. Therefore, the selector 242 selects the frequency bin 310-H and provides frequency bin 310-H to the track processor 276. The portion of the return signal 320 which will be processed by the track processor 276 is shown as portion 330. By passing only that part of the Doppler spectrum falling within the frequency bin 310-H to the track processor 276 (in other words, passing only the portion 330), the signal-to-noise ratio for the radar altimeter is improved since only the noise within portion 330 affects the signal measurement instead of all of the noise present in spectrum 300.

FIG. 3B shows a portion of the Doppler spectrum 350 broken into 24 frequency bins 360-A through 360-X. The frequency bin 360-B represents more positive Doppler shift than the frequency bin 360-A. FIG. 3B illustrates the PMC channel 244, and shows the portion of the Doppler spectrum 350 corresponding to a signal 370 within a level gate. The selector 256 within the PMC 278 selects a frequency bin 360 for further signal processing. A peak 375 of the signal 370 falls closest to the maximum sensitivity of the frequency bin 360-T. The frequency bin 360-T corresponds to a portion 380 of the return signal 370. Therefore, the selector 256 selects the frequency bin 360-T. By passing only that part of the Doppler spectrum falling within the frequency bin 360 to the PMC 278 (portion 380), the signal-to-noise ratio is improved.

Figure 4:
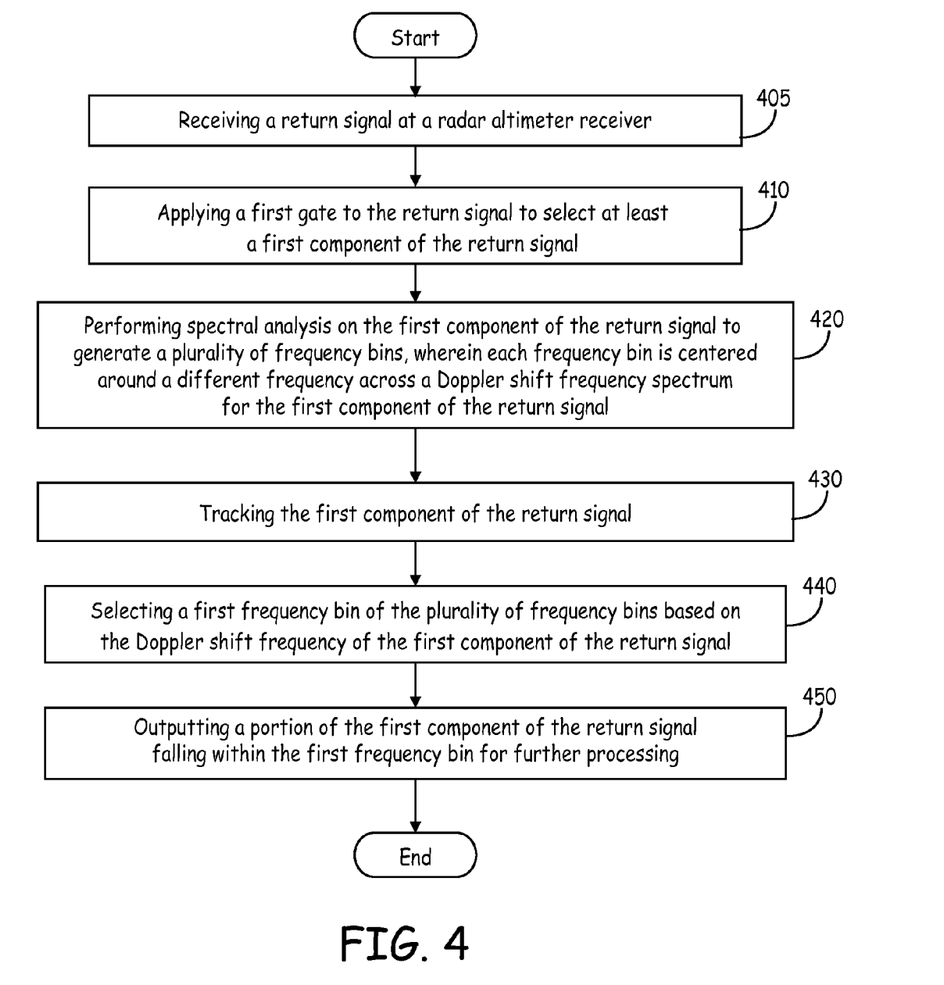
FIG. 4 is a flow diagram illustrating one embodiment of the present invention of a method of Doppler beam sharpening.

FIG. 4 is a flow diagram illustrating one embodiment of the present invention of a method of Doppler beam sharpening. A return signal is received at a radar altimeter receiver at block 405. A first gate is applied to a return signal to select at least a first component of the return signal at block 410. For example, a track gate is applied so the radar altimeter 200 receives return signals for the specific duration of time the gate is applied. Components of the return signal include a target pulse and a maximum signal level.

The method performs spectral analysis on the return signal at block 420. Block 420 comprises performing spectral analysis on a return signal having at least a first component to generate a plurality of frequency bins, wherein each frequency bin is centered around a different frequency in a Doppler shift frequency spectrum. In one embodiment, the spectral analysis comprises applying a windowing scheme and a FFT. In alternative embodiments, a windowing scheme is not applied.

The method proceeds with tracking the first component of the return signal based on feedback from a first processor at block 430. As the aircraft 150 flies towards or away from a target, the return signals will take differing amounts of time to reach the receiver 104. The range gate and level gate must move inbound and outbound depending on whether the aircraft 150 is flying closer to or further away from the target, respectively. Also, the return signals will display different levels of Doppler shift.

The method additionally comprises selecting a frequency bin based on the Doppler shift frequency of at least the first component of the return pulse at block 440. Outputting a portion of the first component of the return signal falling within the first frequency bin for further processing occurs at block 450. Such further processing includes determining the range of the target object (performed by altitude processor 283) or controlling the power level to maintain a constant signal strength for the return pulse (performed by the control loop comprising the PMC 278). In other words, the PMC 278 controls the transmit power of the transmitter to maintain a signal within a frequency bin at approximately a threshold level.

Figure 5:
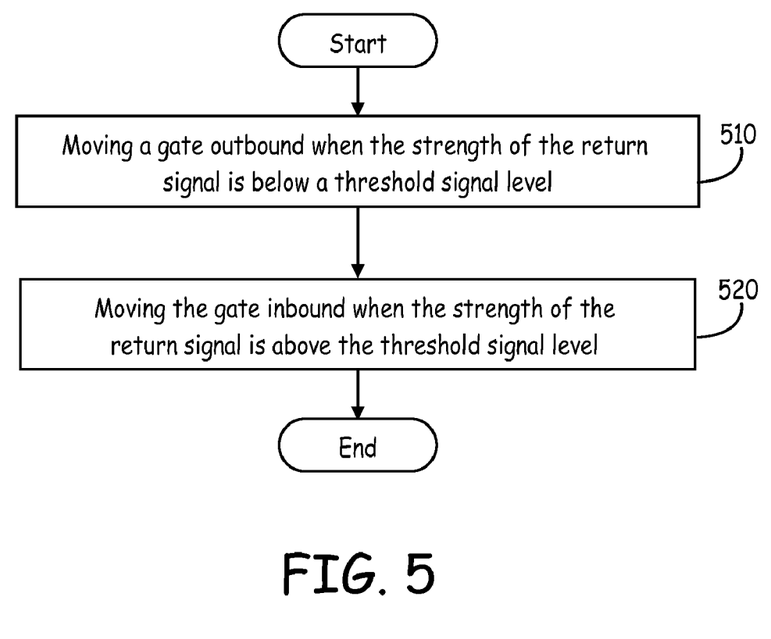
FIG. 5 is a flow diagram illustrating one embodiment of the present invention of a method of tracking a component of a return signal across the Doppler shift frequency spectrum.

One process for tracking the first component in block 430 is shown in FIG. 5. FIG. 5 is a flow diagram illustrating one embodiment of the present invention of a method of tracking a component of a return signal across the range of a target the return signal is reflecting off. The gate moves outbound when the strength of the detected return signal is below a threshold signal level at block 510. The gate moves inbound when the strength of the detected return signal is above a threshold signal level at block 520. The threshold signal level can be set by the processor controlling the gate (for example, the PMC 278 controls the level gate and sets the threshold signal level) for the Doppler channel.

Returning to FIG. 2, for illustrative purposes, tracking is discussed in terms of the track channel 230. The track processor 276 controls the range gate such that the range gate sits on the front edge of the target pulse (in other words, a component of the return signal). The track processor 276 keeps the range gate within a single pulse repetition interval (PRI), which is the time between transmit pulses. The width of the gate will be dependent on the pulse, and can be variable. As the range gate moves out in time and begins to overlap the return signal (corresponding to the target), the range gate will detect increasing signal strength within at least one of the frequency bins. The maximum signal strength is typically detected once the range gate fully overlaps the signal return.

A track loop 234 provides feedback from the track processor 276 to the gating circuit 232 that moves the range gate outbound if the signal is below a threshold level of signal strength in order to detect higher signal strength. If the signal strength is higher than the threshold level, the gate is moved inbound to reduce the detected signal strength. For example, if the aircraft is traveling over a mountain that the radar altimeter is tracking, the leading edge of the return signal moves inbound as the aircraft approaches the mountain and the range gate position will decrease (under control of the track processor 276) to keep the range gate on the leading edge of the return signal. Once the point of the mountain's peak is underneath the altimeter, the range gate moves outbound (in time) to track the target as it moves away from the aircraft.

The level gate and track gate are intended to look at the same target return but the level gate will overlap more of the target return. However, in certain situations, the strongest return signal strength may not correspond with the nearest target. For example, water further away from the aircraft than the target may reflect more signal than the closer target being tracked. If the two gates are not overlapping the same pulse, there will be some error in the range calculation. One of ordinary skill in the art upon reading this specification would appreciate that the gates may be kept close to eliminate such error.

A level gate is controlled by the PMC 278 in a similar manner as the range gate. The level gate tracks the signal with the largest signal strength. However, instead of tracking the leading edge of the signal as the range gate does, the level gate is positioned to significantly or completely overlap the return signal so as to get an accurate estimate of the total signal power. Being placed only to overlap the leading edge would not allow an accurate estimation of the power because the level gate may miss some of the signal. While the system is tracking a target, the level gate's position is placed a certain distance from the leading edge of the range gate based on assumptions that the range gate is positioned on the leading edge of the target and based on the transmitted pulse width or range gate width and the chosen level gate width. The level gate width is not necessarily equal to the pulse width or range gate width but can be between one and two times the transmitted pulse width. The width of the level gate can be selected based on the type of terrain over which the radar is designed to operate.

The radar altimeter can be operated in at least two modes, track mode and search mode. In search mode, signals are transmitted at full power. Search mode also entails that more than one gate positions can be checked simultaneously for valid signal return through applying the FFT (or the Doppler filter banks) in parallel at multiple gate positions to obtain faster searching.

During track mode, the nearest terrain may not be located in the same Doppler channel that the maximum signal is measured. This would be the case for transition from water to land, where the water will provide a strong return, resulting in the power management control (PMC) 278 instructing the altimeter 200 to reduce transmit power. However, the terrain at the edge of the body of water will have a higher Doppler frequency and will be at a shorter distance from the aircraft. In one embodiment, the track channel 230 operates on all Doppler channels while the PMC channel only operates on the channel in which the track channel is detecting the target.

The track processor 276 and the PMC 278 can be implemented using discrete electrical components, integrated circuits, software, firmware, hardware, or any appropriate combination thereof, as known to one of skill in the art. By way of example and not by way of limitation, the hardware components can include one or more microprocessors, memory elements, digital signal processing (DSP) elements, interface cards, and other standard components known in the art. Any of the foregoing may be supplemented by, or incorporated in, specially-designed application-specific integrated circuits (ASIC) and field programmable gate arrays (FPGA). In this exemplary embodiment, processing units 276 and 278 include or function with software programs, firmware or computer readable instructions for carrying out various methods, process tasks, calculations, and control functions, used in controlling a track gate and a level gate (discussed below).

The memory 277 and memory 279 can be implemented as any available physical media that can be accessed by a general purpose or special purpose computer or processor, or any programmable logic device. The memory 277 and 279 comprise, in one implementation of such an embodiment, any suitable form of random access memory (RAM) now known or later developed, such as dynamic random access memory (DRAM). In other embodiments, other types of memory are used. Moreover, the memory 277 and 279 need not be local to the system 200.

Target detection and tracking is implemented on the Doppler spectrum providing the most signal for the nearest detectable target return. This ensures maximum detection capability with minimum transmit power and lower probability of detection or intercept under normal operating conditions. Breaking the Doppler frequency spectrum into smaller frequency bins improves the signal-to-noise ratio for the radar altimeter.

Suitable storage devices or media 241 and 258 include, for example, forms of non-volatile memory, including by way of example, semiconductor memory devices (such as Erasable Programmable Read-Only Memory (EPROM), Electrically Erasable Programmable Read-Only Memory (EEPROM), and flash memory devices), magnetic disks (such as local hard disks and removable disks), and optical disks (such as Compact Disk-Read Only Memory (CD-ROM) disks). Moreover, the storage devices or media 241 and 258 need not be local to the system 200. Also, the memory 277 and 279 comprise, in one implementation of such an embodiment, any suitable form of random access memory (RAM) now known or later developed, such as dynamic random access memory (DRAM). In other embodiments, other types of memory are used.

This description has been presented for purposes of illustration, and is not intended to be exhaustive or limited to the embodiments disclosed. Aspects described with respect to a particular embodiment may be combined with, or replace aspects of, other embodiments. Variations and modifications may occur, which fall within the scope of the following claims. Therefore, it is manifestly intended that this invention be limited only by the claims and the equivalents thereof.

What is claimed is:

1. A method for Doppler beam sharpening in a radar altimeter, the method comprising:
   receiving a return signal at a radar altimeter receiver;
   applying a first gate to the return signal to select at least a first component of the return signal;
   performing spectral analysis on the first component of the return signal to generate a plurality of frequency bins, wherein each frequency bin is centered around a different frequency across a Doppler shift frequency spectrum for the first component of the return signal;
tracking the first component of the return signal;
selecting a first frequency bin of the plurality of frequency bins based on the Doppler shift frequency of the first component of the return signal; and
outputting a portion of the first component of the return signal falling within the first frequency bin for further processing.

2. The method of claim 1, wherein tracking the first component of the return signal further comprises positioning a track gate on a leading edge of a target signal.

3. The method of claim 1, wherein tracking the first component of the return signal further comprises positioning a level gate to overlap a portion of a strongest signal component of the return signal.

4. The method of claim 3, further comprising maintaining a signal level within the first frequency bin at an approximately constant signal strength by varying the power level of a transmitted signal.

5. The method of claim 1, further comprising applying a windowing scheme to the return signal.

6. The method of claim 5, wherein the windowing scheme is selected from a group consisting of a Hamming, Hann, and Blackman windowing scheme.

7. The method of claim 1, further comprising checking the plurality of frequency bins for a signal level above a threshold signal level to determine if a target signal is present.

8. The method of claim 1, wherein tracking the first component of the return signal further comprises:
moving a gate outbound when the strength of the return signal is below a threshold signal level; and
moving the gate inbound when the strength of the return signal is above the threshold signal level.

9. The method of claim 1, wherein each frequency bin overlaps at least another frequency bin by at least 50%.

10. A Doppler beam-sharpened radar altimeter, comprising:
a processor generating a range gate, wherein the range gate tracks a first component of the return signal;
a spectral analyzer performing spectral analysis on a return signal to generate a plurality of frequency bins, wherein each frequency bin is centered around a different frequency in a Doppler shift frequency spectrum;
a selector selecting a frequency bin for further processing; and
a power management circuit (PMC) for:
detecting the signal strength of the return signal; and
maintaining the signal strength of the return signal at an approximately constant level by varying the transmit power of a transmitted signal.

11. The radar altimeter of claim 10, wherein the spectral analyzer further comprises a plurality of band-pass filters spaced across the Doppler shift frequency spectrum, wherein each band-pass filter is centered about a different frequency.

12. The radar altimeter of claim 10, wherein the plurality of band-pass filters are spaced equally across the Doppler shift frequency spectrum and overlap each other such that any possible Doppler frequency the return signal could exhibit is within the frequency of at least one band-pass filter.

13. The radar altimeter of claim 10, wherein the spectral analyzer further comprises a fast Fourier transform (FFT).

14. The radar altimeter of claim 10, wherein the processor is further operable to:

move the range gate outbound when the strength of the return signal is below a threshold signal level; and
move the range gate inbound when the strength of the return signal is above the threshold signal level.

15. A Doppler beam-sharpened radar altimeter, comprising:
a receiver for receiving a return signal; and
a track channel communicatively coupled to the receiver, wherein the track channel comprises:
a first gating circuit that generates a range gate, wherein the range gate tracks the return signal;
a track processor, wherein the track processor applies a windowing scheme to the return signal;
a first spectral analyzer that generates a first plurality of frequency bins corresponding to a Doppler shift frequency spectrum of the return signal; and
a first selector that selects a first frequency bin of the first plurality of frequency bins based on the Doppler shift frequency of a first component of the return signal.

16. The radar altimeter of claim 15, further comprising:
a power management control (PMC) channel communicatively coupled to the receiver, wherein the PMC channel comprises:
a second gating circuit that generates a level gate, wherein the level gate tracks the return signal;
a PMC processor, wherein the PMC processor applies a windowing scheme to the return signal;
a second spectral analyzer that generates a second plurality of frequency bins corresponding to the Doppler shift frequency spectrum of the return signal; and
a second selector that selects a first frequency bin of the second plurality of frequency bins.

17. The radar altimeter of claim 16, further comprising an altitude processor communicatively coupled to the track processor and the PMC processor, wherein the altitude processor determines a range to a target.

18. The radar altimeter of claim 16, wherein:
the first spectral analyzer applies a fast Fourier transform (FFT) to the return signal to generate the first plurality of frequency bins; and
the second spectral analyzer applies an FFT to the return signal to generate the second plurality of frequency bins.

19. The radar altimeter of claim 16, wherein:
the first spectral analyzer comprises a first bank of band pass filters, wherein each band pass filter of the first bank of band pass filters is centered around a different frequency of the Doppler shift frequency spectrum; and
the second spectral analyzer comprises a second bank of band pass filters, wherein each band pass filter of the second bank of band pass filters is centered around a different frequency of the Doppler shift frequency spectrum.

20. The radar altimeter of claim 16, further comprising:
wherein the first frequency bin of the second plurality of frequency bins covers the same Doppler frequency shift bandwidth as the first frequency bin of the first plurality of frequency bins; and
wherein the PMC processor controls a transmit power of a transmitter to maintain a signal within the first frequency bin of the first plurality of frequency bins at approximately a threshold level.

* * * * *